US008781696B2

(12) United States Patent  
Beyer et al.

(10) Patent No.: US 8,781,696 B2  
(45) Date of Patent: Jul. 15, 2014

(54) VARIABLE TRANSMISSION AND METHOD

(75) Inventors: Michael D. Beyer, Chillicothe, IL (US); Chad T. Brickner, Aurora, IL (US); Christopher Rhoades, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 13/486,123

(22) Filed: Jun. 1, 2012

(65) Prior Publication Data  
US 2013/0325272 A1 Dec. 5, 2013

(51) Int. Cl.  
G06F 7/70 (2006.01)  
G06F 19/00 (2011.01)  
B60W 10/101 (2012.01)

(52) U.S. Cl.  
CPC .................... B60W 10/101 (2013.01)  
USPC .......................................................... 701/54

(58) Field of Classification Search  
CPC .................................................. B60W 10/101  
USPC .......................................................... 701/54  
See application file for complete search history.

(56) References Cited

U.S. PATENT DOCUMENTS

| | | | |
|---|---|---|---|
| 4,220,059 A * | 9/1980 | Mizuno et al. | 477/68 |
| 4,478,041 A | 10/1984 | Pollman | |
| 4,701,853 A * | 10/1987 | Osanai | 701/58 |
| 4,776,233 A | 10/1988 | Kita et al. | |
| 7,503,173 B2 | 3/2009 | Dong et al. | |
| 8,186,967 B2 * | 5/2012 | Kong | 417/44.1 |
| 2001/0029218 A1 | 10/2001 | Cronin et al. | |
| 2003/0228952 A1 | 12/2003 | Joe et al. | |
| 2009/0005914 A1 * | 1/2009 | Demarco et al. | 700/282 |
| 2011/0087411 A1 | 4/2011 | Fuller | |
| 2011/0094214 A1 | 4/2011 | Nelson et al. | |
| 2011/0269583 A1 * | 11/2011 | Kawakami et al. | 474/28 |
| 2012/0198832 A1 * | 8/2012 | Fukumoto | 60/459 |
| 2013/0085647 A1 * | 4/2013 | Lister et al. | 701/55 |

FOREIGN PATENT DOCUMENTS

| | | |
|---|---|---|
| EP | 0558748 | 9/1993 |
| JP | 09042446 | 2/1997 |
| WO | 2004/085190 A1 | 10/2004 |

* cited by examiner

Primary Examiner — Mary Cheung  
Assistant Examiner — Frederick Brushaber  
(74) Attorney, Agent, or Firm — Leydig, Voit & Mayer

(57) ABSTRACT

A powertrain includes an engine, a transmission having a first input connected to an engine output shaft, and a variator. The variator includes a pump connected to the engine output shaft and a motor connected to a second input of the transmission. The pump has a variable setting that is determinable by a position of a pump actuator in response to a command signal. A controller associated is disposed to control operation of the variator, at least in part, by providing the command signal to the pump actuator. The command signal is determined based on an operator command and on a compensation term, which depends on a correlation function of a parameter related to the speed ratio between a pump speed and a motor speed and a flow characteristic of the pump actuator.

20 Claims, 6 Drawing Sheets

VARIABLE TRANSMISSION AND METHOD

TECHNICAL FIELD

This patent disclosure relates generally to vehicle or machine transmissions and, more particularly to continuously variable transmissions having hydraulically operated variators.

BACKGROUND

Various vehicles or machines such as wheel loaders use a torque converter in their powertrains between their engine and transmission. The torque converter can be used in a locked or an unlocked mode when the machine is moving, which provides for a desirable torque control feature for some machines that may encounter relatively immovable obstacles. For example, a wheel loader may push a bucket against a pile of material, a ripper may encounter a boulder, and so forth. Torque converter slippage is relied upon to provide a transmission output torque control benefit, for example, when contact with the obstacle is initiated, because it results in limiting transmission input torque and reducing the possibility of low engine lug issues, such as engine underspeed or stalling. However, torque converter slippage and other losses have been found to increase overall fuel consumption of the machine when compared to other power transmission methods such as continuously variable transmissions (CVTs).

CVTs provide a continuously variable torque capability, which is an improvement over a traditional toque converter/transmission powertrains. A typical CVT employs a torque controlling element that provides a continuously variable torque or speed transmission capability. One known application of CVTs for machine use is embodied as a split torque transmission, which includes a drive train that is powered by dual inputs—one input being a torque- or speed-controlled input, such as from a hydraulic variator, and the other being a direct power input from an engine. These two inputs are combined in a planetary gear arrangement, which includes outputs driving the various gear ratios of the transmission.

In split torque transmissions, it is desirable to accurately control the variator such that the resultant system operation quickly tracks operator inputs. For example, a response lag time to an operator input may cause a temporary discrepancy between the expected and actual operation of the system, which may result in deteriorated shifting performance thus causing operator discomfort, system inefficiency, and/or increased drive train wear. In some instances, such time lag may cause engine underspeed and/or stall. In other words, as efficient as CVTs are in terms of fuel economy, they are also known to be relatively slow to respond to operator commands in that time delays between an operator command and a change in the operation of the variator, and thus the transmission, are known to exist. These time delays are especially evident when a machine having a CVT-assisted powertrain such as a wheel loader encounters an obstacle. In such conditions, the delay between an operator command to stop moving against the obstacle, and an actual change in motion of the machine, may cause engine underspeed or even stalling.

Various solutions have been proposed in the past to improve the response of CVT transmissions. One such example can be found in U.S. Patent Application Pub. No. 2011/0087411 A1 ("Fuller"), which was published on Apr. 14, 2011. Fuller describes an electronic controller for controlling a mechanical variator device. In the system of Fuller, CVT response is improved by differentiating a control pressure request with respect to time, for example, by numerically differentiating the pressure request and multiplying the differential by a factor, to obtain a compensation value. The compensation value is applied to modify a control pressure request sent to a hydraulic valve arrangement that controls the reaction torque of the variator, and essentially operates as a derivative-type term of the command signal in the control scheme of the transmission. Although the compensation value acquired in this fashion may be effective in improving the control stability of the transmission by counteracting inherent system dampening, it would be ineffective in specifically addressing engine underspeed issues when an immovable object is encountered because it depends on the rate of change of the operator command, which can vary depending on the driving style of a particular operator and thus provide unpredictable operating response of the system under all conditions.

SUMMARY

The disclosure describes, in one aspect, a powertrain. The powertrain includes an engine, a transmission having a first input connected to an engine output shaft, and a variator. The variator includes a pump connected to the engine output shaft and a motor connected to a second input of the transmission. The pump has a variable setting that is determinable by a position of a pump actuator, which is responsive to a command signal. A controller is associated with the engine, transmission and variator. The controller is disposed to control operation of the variator, at least in part, by providing the command signal to the pump actuator. The command signal is determined based on an operator command and on a compensation term, which depends on a correlation function of a parameter related to the speed ratio between a pump speed and a motor speed, and on a flow characteristic of the pump actuator.

In another aspect, the disclosure describes a continuously variable transmission. The continuously variable transmission includes a variator associated with a transmission. The variator includes a variator pump having a variable setting that is determinable by a position of a pump actuator that is responsive to a command signal. A variator motor is driven by the variator pump and is connected to an input of the transmission. A controller is disposed to control operation of the variator, at least in part, by providing the command signal to the pump actuator. The command signal is determined based on an operator command and on a compensation term, which is determined based on a correlation function of a derivative of the speed ratio between a pump speed and a motor speed, and a flow characteristic of the pump actuator.

In yet another aspect, the disclosure describes a method for improving a transient torque response of a continuously variable transmission that includes a variator associated with a transmission. In one embodiment, the variator includes a variable pump controlled by a pump actuator that is responsive to a command signal from a controller. The pump operates a motor connected to an input of the transmission. The method includes determining a closed-loop command signal for the pump actuator in the controller based on an operator command signal that is indicative of a desired torque output of the transmission. A derivative of a speed ratio between a pump speed and a motor speed of the variator, and a hydraulic fluid flow through the pump actuator of the variator, are calculated in real time. A compensation command signal for the pump actuator is determined based on a correlation function that determines the compensation command signal based on the derivative of the speed ratio and the hydraulic fluid flow. The closed-loop command signal is combined with the compensation command signal into a compensated command signal, which is provided to the pump actuator.

DETAILED DESCRIPTION

Figure 1:
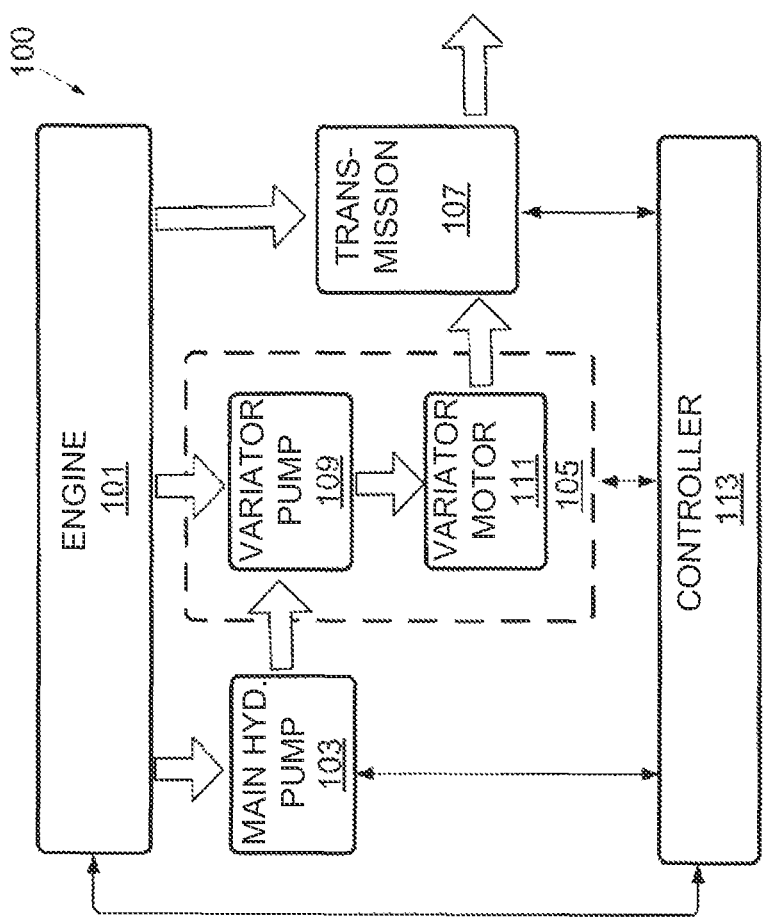
FIG. 1 is a schematic illustration of a machine powertrain in accordance with the disclosure.

This disclosure relates to vehicle and machine powertrains and, more specifically, to powertrains that include a variator operating in conjunction with a continuously variable transmission (CVT). A schematic illustration for a powertrain 100 is shown in FIG. 1. The powertrain 100 includes an engine 101, which in the illustrated embodiment acts as the prime mover for the system but other prime movers such as an electric motor can be used. The engine 101 is connected to and drives a main hydraulic pump 103. The main hydraulic pump 103 may be used to operate numerous components and systems of the machine such as actuators, work implements and the like. In the illustrated embodiment, the powertrain 100 uses hydraulic power from the main hydraulic pump 103 to operate various functions of a propel system of the machine. Accordingly, hydraulic power from the main hydraulic pump 103 is provided to a variator 105. Mechanical power from the variator 105 and from the engine 101 are provided to a transmission 107. The engine 101 also mechanically drives components of the variator 105 in the known fashion. In this way, the transmission 107 receives dual power inputs, one from the variator 105 and the other from the engine 101 in the known fashion. Although a hydraulic-power based system is illustrated here, other types of power transmission such as electrical or mechanical can be used.

Various examples of variators operating in conjunction with transmissions can be found in U.S. application Ser. Nos. 13/407,280 and 13/407,311, both of which are incorporated herein in their entirety by reference. In a representative example of such structures, an output of the variator is connected to a ring gear of a planetary gear set. An engine input is connected to the planet gears of an additional planetary gear arrangement. The ring gear of the additional planetary gear arrangement is connected to the planet gears of the first planetary gear arrangement, while outputs from the sun gears of both planetary gear arrangements and the planet gears of the first planetary gear arrangements are used to run gears at various ratios of the transmission. During operation, shifts between various forward and reverse gear ratios are carried out at a relative speed of about zero between the outgoing and incoming gears. To this end, the variator is used to adjust the speed of the ring gear of the first planetary gear set such that the combined speed of an output member can be at a zero rotation speed when the machine or vehicle is stationary notwithstanding the rotational input provided by the engine to the planetary gear of the second planetary gear. The variator thus operates at a variable speed, in two directions, while the powertrain is active.

In the illustrated embodiment, the variator 105 is a hydrostatic-type variator that includes a variator pump 109 and a variator motor 111, but other types of variators can be used. During operation, the engine drives the variator pump 109, which has a variable displacement capability and which operates to circulate fluid through the variator motor 111. The powertrain 100 includes a controller 113 for monitoring and controlling the operation of the various systems and components that are associated therewith. It is contemplated that while the system illustrated in FIG. 1 is a split torque system, other types of system may instead be used. For example, the disclosed principles will also provide benefits within a simple direct series hydrostatic ("hystat") system, where an engine-driven pump supplies fluid to operate a motor that is connected to the input or output side of the transmission.

Power in the powertrain 100 originates from the engine 101. The engine 101 supplies power to the transmission 107 and the variator pump 109 via direct input, and also supplies power to the main hydraulic pump 103. The main hydraulic pump 103 supplies fluid via the fluid supply line to the variator 105. The power output of the system is provided by the transmission 107. During operation, the controller 113 receives operational data from the engine 101, variator 105, and transmission 107. The controller 113 controls the operation of the engine 101, variator 105, and transmission 107 in response to this data, and in accordance with user input and potentially other information related to operating goals and/or conditions.

Unlike previously proposed systems, this disclosure relates to a system and method for improving variator response by providing a compensation term in addition to a feed forward term to control operation of the variator during transient torque events in a fashion that is less dependent on the particular rate of change of the operator commands and more dependent on the rate of load being applied to the system. When using the described system, unpredictable operation that may depend on particular operator control inputs is avoided by performing transient variator control on the basis of physical parameters within the variator. In this way, system accuracy and response time can be improved over existing control methodologies, especially when operating in extreme conditions such as when the machine encounters an immovable obstacle. In one embodiment, the compensation term is determined on the basis of the variator speed ratio, which is indicative of the operating state of the variator. In an alternative embodiment, the compensation term is determined on the basis of a derivative of the variator speed ratio, which is indicative of the hydraulic fluid flow into and out of a hydraulic actuator associated with the variator, which is configured to change a variator setting based on a pressure difference applied on a double acting piston. Each of these embodiments is described in further detail in the following paragraphs.

Figure 2:
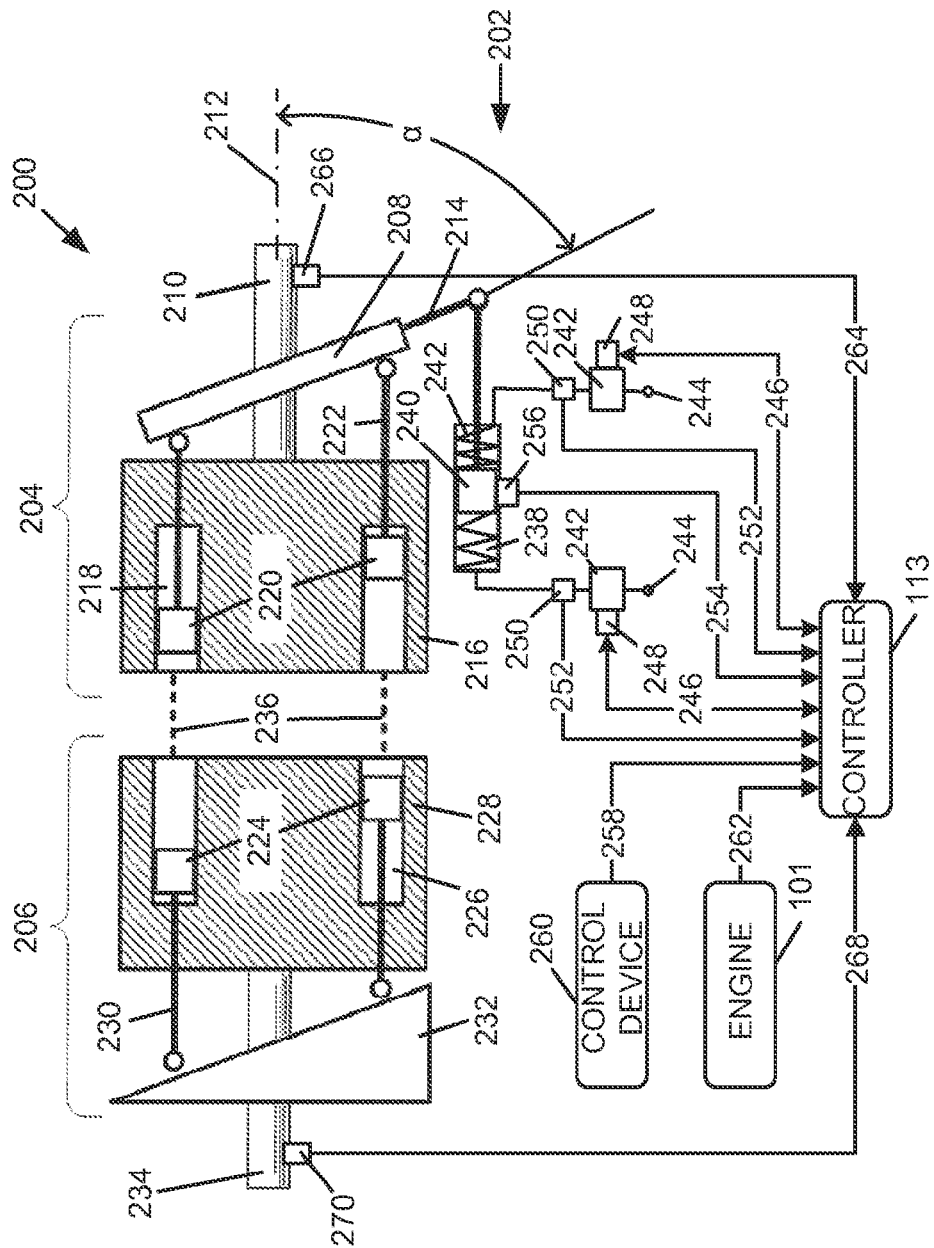
FIG. 2 is a schematic drawing of a variator control system in accordance with the disclosure.

To illustrate the structures associated with one embodiment of the present disclosure, a schematic drawing that includes a cross-section of a variator 200 for providing a variable output torque based on an applied control pressure differential in a swash plate actuator 202 is shown in FIG. 2. The variator 200 comprises a pump 204 and a motor 206. The pump 204 comprises a variable angle swash plate 208, whose angle is set by the swash plate actuator 202. In the illustrated embodiment, the swash plate 208 is pivotally connected relative to an input shaft 210. An angle, a, of the swash plate 208 relative to a centerline 212 of the input shaft 210 is adjustable as the actuator 202, which is embodied here as a linear actuator, changes positions and pushes or pulls on a two-bar linkage 214. Although a linear actuator having a linkage is shown, it is contemplated that other actuator types such as rotary actuators may be used.

In the simplified illustration of FIG. 2, the pump 204 includes a barrel 216 that forms a plurality of bores 218. The bores 218 extend parallel to one another and are arranged at equal angles in a circular pattern around the drive shaft centerline 212. The pump barrel 216 may be splined to and attached to rotate with the input shaft 210. Each bore 218 reciprocally accepts a piston 220 that is connected to a rod 222 having a fixed length and being constrained to axially move along a single direction relative to the housing 216. The rods 222 slidably engage the swash plate 208 such that, as the barrel 216 rotates and the swash plate 208 is disposed at an angle relative to the input shaft 212, it causes the pistons 220 to reciprocate within the bores 218 and to create a plurality of reciprocating piston pumps that push fluid and pull fluid. Additional fluid circuit components such as fluid coolers, a fluid reservoir and the like have been omitted from the illustration of FIG. 2 for simplicity. The range of motion of the pistons within their respective bores, and thus the amount or volume of fluid moved thereby, depends on the angle of the swashplate. Other structures such as inlet and outlet valves corresponding to each bore 218, fluid inlet or outlet ports, fluid reservoirs, springs acting to return the pistons 220 to one position or the other, or the like are also not shown in FIG. 2 for simplicity.

The motor 206 is constructed in a similar fashion as the pump 204 to include a plurality of pistons 224, each disposed within a bore 226 formed within a motor barrel 228. Connecting rods 230 relate the motor pistons 224 to a motor swash plate 232, which in the illustrated embodiment is shown to have a fixed angle but may alternatively have a variable angle. The motor swash plate 232 is fixed around a rotatable output shaft 234. The motor barrel 228 is connected and arranged to rotate with the output shaft 234 such that the output shaft 234 is rotated when pressurized fluid is supplied to the motor bores 226. To this end, high pressure fluid lines 236 interconnect the bores 218 of the pump 204 with the bores 226 of the motor 206 for fluid transfer under a variable pressure and volume therebetween. Pressure sensors (not shown) associated with the high pressure fluid lines 236 are configured to provide pressure readings or pressure difference readings relative to fluid pressure present in those lines.

During operation, as the input shaft 210 is rotated, for example, by the engine 101 (FIG. 1), while the swash plate 208 of the pump 204 is disposed at an angle cc other than perpendicular relative to the input shaft 210 centerline 212, the pump pistons 220 are moved to create a pressurized fluid flow through the fluid lines 236. The pressure and/or flow of fluid provided through the fluid lines 236 depends on the inclination or angle of the pump swash plate 208. Fluid from the lines 236 causes the respective motor pistons 224 to move and thus the ends of the connecting rods 230 to move the motor barrel 228 causing the output shaft 234 to rotate. The speed and direction of rotation of the output shaft 234 depends on the angle a, which in turn depends on the position of the swash plate actuator 202 as previously described. The torque of the output shaft 234 varies with the net force that is applied to the pump swash plate 208. It should be appreciated that the fluid pressure within the high pressure fluid lines 236, and thus the force required to move the pump barrel 216, will depend on the torque passing through the variator.

In the illustrated embodiment, the swash plate actuator 202 is embodied as a dual-acting piston that operates on a hydraulic pressure differential applied across two opposed piston faces. Specifically, a piston bore 238 slidably accepts a piston 240 that is biased towards a central position by two springs. A pressure difference of fluid applied on either side of the piston 204, along with spring forces by the springs, and a driven load applied through the pump 204 on the swash plate 208, will result in a net force experienced at the piston 240, which can be balanced for steady-state operation and be overcome in one direction or the other by appropriate adjustment of the pressure differential across the piston 240 when maintaining or changing the angle a of the swash plate 208. It is noted that although a double-headed piston is shown, any other hydraulic actuator configuration may be used, for example, separate cylinders pushing in two different directions, or a different type of actuator may be used such as an electric actuator.

When moving the actuator 202, fluid under pressure may be caused to enter or exit from a respective side of the piston 240. In the illustrated embodiment, fluid pressure acting in either side of the actuator piston 240 is regulated by a two electronic pressure regulator valves (ePRV) 242. Each ePRV 242 draws fluid from a pressurized fluid source 244 and shunts a sufficient portion of that fluid to a reservoir (not shown) to achieve a desired pressure at its outlet, i.e., within the bore 238 on the respective side of the piston 240. The pressurized fluid at the source 242 may be provided by the main hydraulic pump 103 (FIG. 1) or may alternatively be supplied by any other appropriate pumping means associated with the machine 100. Fluid shunted from each ePRV 242 is returned to a drain or reservoir (not shown).

Operation of the two ePRVs 242 is monitored and controlled by the controller 113 (also shown in FIG. 1) in the illustrated embodiment, although a different, standalone controller can be used. The controller 113 provides valve command signals 246 via appropriate communication lines to an actuator 248 associated with each ePRV 242. A pressure sensor 250 is disposed to monitor hydraulic fluid pressure at the outlet of each ePRV 242 and provide a pressure signal 252 to the controller 113. The controller 113 further receives a pump displacement signal 254 provided by a displacement sensor 256 associated with the actuator 202.

Although not directly a part of the variator 200, the illustration of FIG. 2 shows some additional inputs received by the controller 113. Specifically, the controller 113 receives an operator signal 258, which is provided by a control device 260 that is manually or automatically operated to set a ground travel speed and direction for a machine, and an engine signal 262, which is indicative of various operating parameters of the engine 101 (also shown in FIG. 1). Other signals may also be used. Specifically regarding the operation of the variator 200, the controller 113 receives an input speed signal 264 that is provided by an input speed sensor 266, and an output speed signal 268 that is provided by an output speed sensor 270. As shown, the input speed signal 264 is indicative of the input speed of the pump input shaft 210 and the output speed signal 268 is indicative of the output speed of the motor shaft 234, but the speed of other rotating components within the variator 200 or the transmission 107 (FIG. 1) can be used instead.

The controller 113, based at least on the various inputs of the variator and the system in which it operates, is configured to provide appropriate commands to the ePRVs 242 that improve the torque response of the powertrain 100 (FIG. 1), especially under operating conditions in which swift torque changes are required to avoid or minimize engine underspeed, for example, such as when a ripping machine encounters hard earth, a loader pushes against a pile with its bucket, and the like. In one embodiment, the controller accomplishes this by appropriately implementing an operator command-to-variator actuator feed-forward flow compensation control strategy, where variator actuator position is changed based on the operator's command signal and on a compensation term that is provided to account for delays in actuator response. In one aspect, actuator delays may be the result of fluid flowing into or out from the variator actuator, which is expected to occur during a transient where the actuator must displace to account for the changing torque applied across the variator. When fluid flows into or out from the variator actuator, fluid pressure at the respective ePRV 242 will drop or rise, which will in turn affect the pressure difference across the variator actuator 202. The time required to stabilize the fluid flow and thus the pressure differential across the actuator 202 contributes substantially to the time lag in the response of the variator to changing torque conditions. The compensation term applied to increase or reduce the respective command signal provided to each of the ePRVs 242 is effective in substantially counteracting pressure fluctuations in the variator actuator 202 during torque transients, and thus improves system performance. In one embodiment, the feed forward term is provided by a lookup table that correlates variator actuator flow versus variator speed ratio. Additionally, a compensation term can be calculated based on the rate of change of the variator speed ratio, which is parameter indicative of the direction and amount of fluid flow into and out from the actuator, which is manipulated to yield a flow force that is converted to a current required to counteract any lag effects in the actuator.

Figure 3:
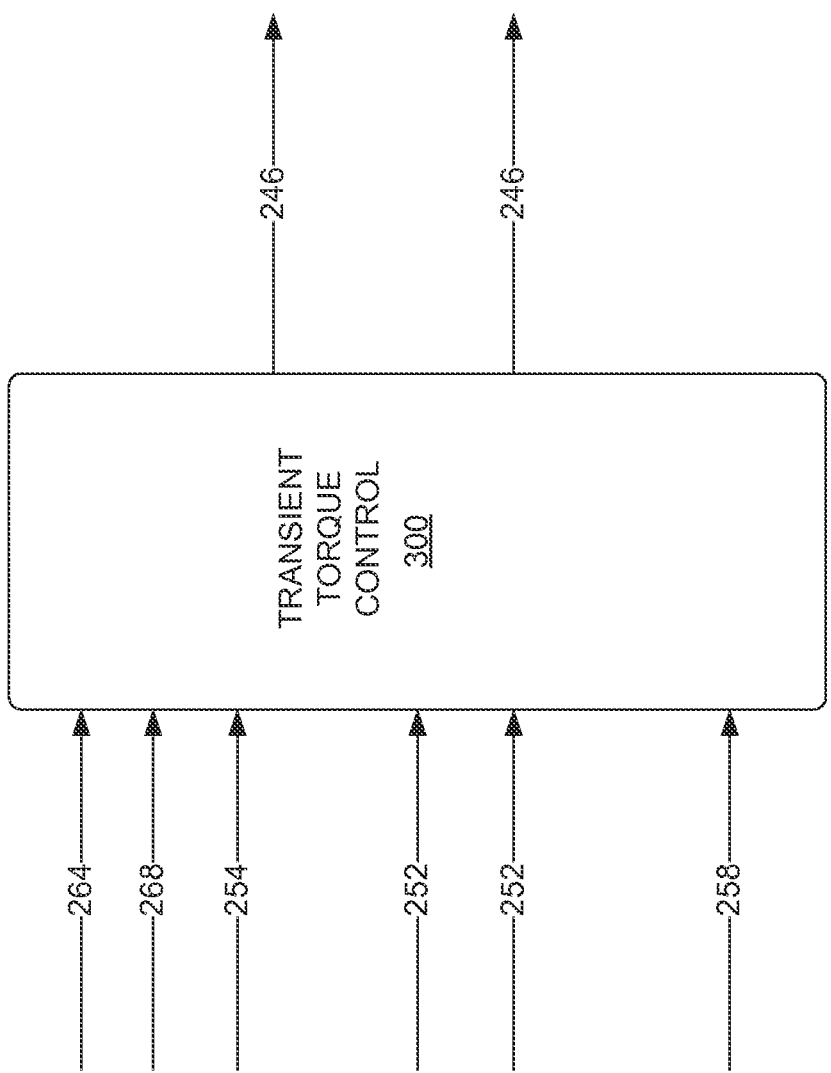
FIG. 3 is a block diagram for a controller in accordance with the disclosure.

FIG. 3 is a block diagram for a transient torque control 300 that is suitable for operation within the controller 113. As shown here, the control 300 receives various input signals, processes these and other signals, and provides commands to system components and systems. More specifically, the controller 300 receives the input and output speed signals 264 and 268 (FIG. 2), which are indicative of the then current operating condition of the variator. The control 300 further receives the pump displacement signal 254, which is indicative of the pump displacement setting of the variator as an indication of the fluid flow passing from the pump to the motor. Alternatively, the pump displacement signal 254 may be replaced or be input in addition to one or more pressure signals that are indicative of fluid pressure within the high pressure fluid lines 236 that connect the variator pump with the variator motor, which is correlated to the torque passing through the variator.

The fluid pressure on either side of the pump actuator is also provided to the controller, in this case, in the form of the pressure signals 252 (FIG. 2). The operator command 258 is also provided, which is indicative of the desired ground speed of the machine as correlated to a variator setting by an appropriate function (not shown). Based on these inputs, the control 300 calculates and provides feed-forward-adjusted command signals 246 to each of the ePRV actuators 248. It should be appreciated that each of the two command signals 246 is tailored for the respective side of the actuator 202 to which it acts such that the two signals 246 are expected to be different at most times while the position of the variator actuator 202 is changing.

Figure 4:
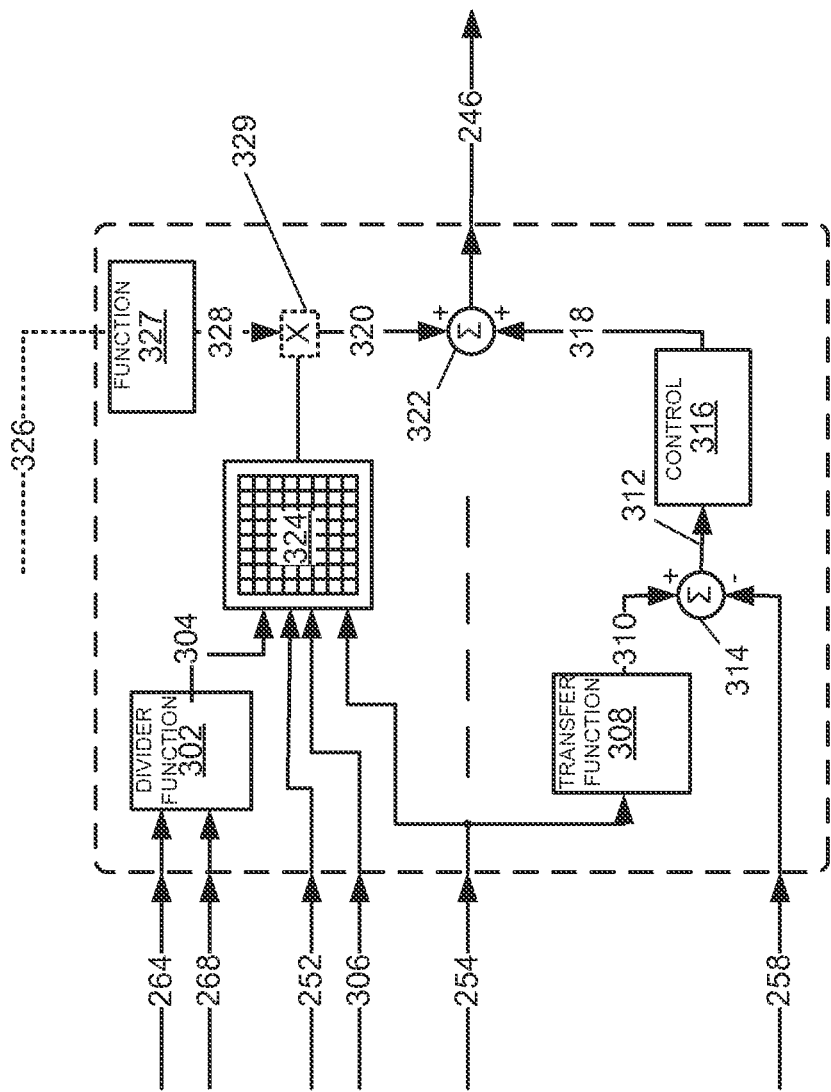
FIG. 4 is a block diagram for one embodiment of a controller in accordance with the disclosure.

A particular implementation for the determination of one of the command signals 246 is shown in the block diagram shown in FIG. 4. Here, the input and output speeds 264 and 268 are provided to a divider function 302, which calculates a speed ratio 304. The speed ratio 304 is indicative of the input to output speed ratio of the variator. A hydraulic system pressure somewhere upstream of the ePRV being controlled here is provided as a system pressure signal 306. The pressure signal 252 downstream of the respective ePRV is also provided, as is the pump position setting 254. The command signal 258 is also provided.

During operation, the function of each ePRV is accomplished by a closed loop control scheme that uses the pump setting as feedback. Alternatively, the closed loop control of the steady state position of the actuator can be based on a pressure difference between a pushing and a pulling fluid pressure that is present in the high pressure fluid lines 236 of the variator 200, as shown in FIG. 2. In the illustrated embodiment, the pump setting 254 is provided to a transfer function 308 that converts the pump setting 254 to a measured, determined or actual pressure condition 310 of the respective ePRV. A setting difference or error 312 between the desired operator command 258 and the actual pressure condition 310 is calculated at a difference function 314 and is provided as an input to a control 316. As shown here, the control 316 is a standard proportional, integral and derivative (PID) term controller, but any other type of controller may be used. The control 316 provides a closed-loop control signal 318.

Concurrently with the determination of the closed loop control signal 318, an open-loop or feed-forward control signal 320 is also determined, which is added to the closed-loop control signal 318 at a summing junction 322 to provide a total control signal 246 (FIG. 2), which is then provided to the respective ePRV actuator 248. In other words, the command signal provided to each ePRV includes a closed-loop control signal, which operates to achieve a desired pressure setting that corresponds to an operator command, and an open loop signal, whose effect is temporary and aids the ePRV overcome system dampening effects and quickly respond to operator commands.

The determination of the open loop signal 320 includes providing the speed ratio 304, the pressure signal 252 of the respective ePRV, the system pressure 306, and the actual pump setting 254 to a multi-dimensional correlation function 324. In FIG. 4, the function 324 is embodied as a multi-dimensional lookup table but other types of correlation or determination functions may be used. The correlation function 324 is populated with predetermined values for the control signal that are sufficient to overcome any dampening effects of the system that may be present under specific speed ratio, actuator flow and pump setting conditions. In this way, during operation, the command signal can be sufficiently augmented to overcome or at least minimize any inertia effects of the system to allow the system to respond rapidly to changing operating conditions. The variator speed ratio, pressure difference across the ePRV, and pump setting are advantageously used herein to correlate the feed forward term because these parameters are together indicative of the load carried by the system as well as the flow of hydraulic fluid through the system. It has been determined that flow-related aspects of the system operation are the major contributors to inertia effects of the system, for example, due to pressure and flow losses of the fluid passing through various system components.

The transient response of the variator may be further optimized for specific operating conditions by use of additional machine or system parameters. For example, when desiring to optimize system operation at low ground speeds to even more effectively avoid engine underspeed, the feed forward term 320 may optionally be further modified on the basis of the ground speed 326 of the machine, which is shown in FIG. 4 in dashed lines. In the illustrated embodiment, which is optional, the ground speed 326 is provided to a one-dimensional function 327. The function 327 provides a scaling factor 328 that is applied to the feed forward control signal 320 at a multiplier 329. The scaling factors 328 can be predetermined and preprogrammed into the function 327 to provide a selectively enhanced or muted effect of the feed forward term depending on the speed of the machine. For example, the effect may be enhanced at low ground speeds to provide a quick control response and avoid engine underspeed. Similarly, the effect may be muted, for example, by providing scaling factors that are less than one, at higher engine speeds to provide for smoother shifting since the likelihood of engine underspeed at higher ground speeds is less.

Figure 6:
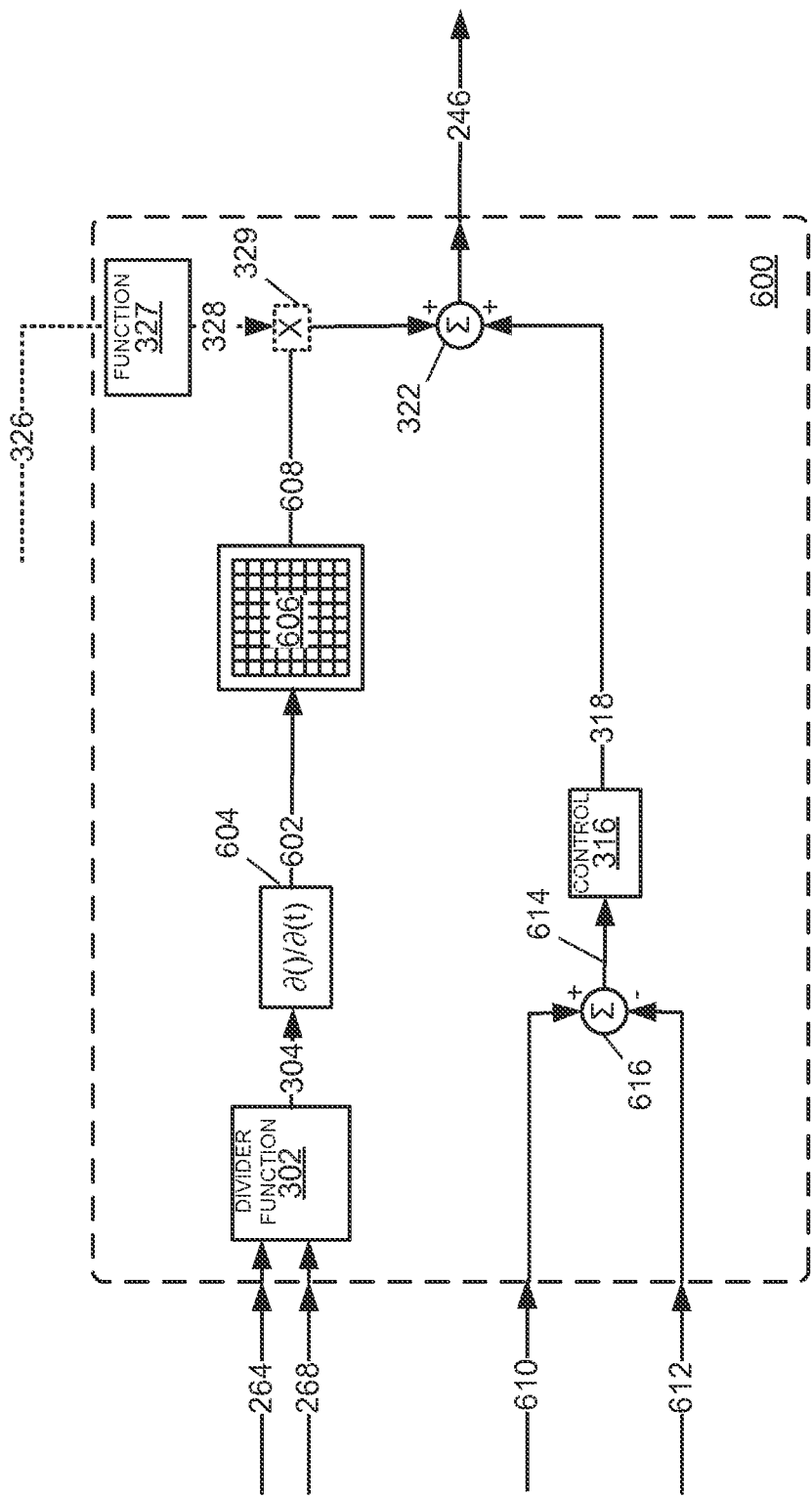
FIG. 6 is a block diagram for an alternative embodiment of a controller in accordance with the disclosure.

An alternative embodiment for a controller 600 that determines the command signals 246 is shown in the block diagram of FIG. 6. In this embodiment, the input and output speeds 264 and 268 of the variator are provided to a divider function 302, which calculates the speed ratio 304. A speed ratio derivative term 602 is calculated at a function 604 based on the speed ratio 304. The derivative term 602 of the speed ratio 304 is indicative of the flow of hydraulic fluid into or out from the variator actuator 202 (FIG. 2). The derivative 602 is provided to a table 606, which can alternatively be embodied as a function. The table 606 correlates the derivative 602 with a compensation parameter 608. This correlation can be determined experimentally transforming the derivative 602 into an actual fluid flow magnitude and direction for a particular system, correcting the fluid flow for the particular geometry of the system and the particular ePRV that is used in the system, calculating an equivalent flow orifice area of the system, determining a flow force that results in that particular system under these and/or other, similar parameters, and finally correlating the flow force to a current that should be provided to the ePRV to counteract the flow force and, thus, the pressure drop of fluid within the actuator. Although the various values populated in the table 606 can be determined experimentally, they can alternatively be calculated in real time during operation in a function that includes specific fluid flow equations, a model-based algorithm, or any other appropriate calculation device.

The command signals 246 during steady-state operation are provided based on a pressure difference 610 present between high/low pressures within the fluid lines 234 (FIG. 2) that interconnect the variator motor with the pump. An error 614 between the pressure difference 610 that is then present in the variator and a pressure difference setpoint 612 is calculated at a differentiator 616. The error 614 is provided as an input to a control 316. As shown here, the control 316 is a standard proportional, integral and derivative (PID) term controller, but any other type of controller may be used. The control 316 provides a closed-loop control signal 318. The closed-loop control signal 318 is provided to an adder function 322, where it is combined with the compensation parameter 608. When operating in a steady-state condition, the compensation parameter 608 may be substantially zero such that the command signal 246 is about equal to the closed-loop control signal 318. When a torque transient is present, the derivative term 602 will become non-zero, which will cause a non-zero compensation term 608 to be provided from the table 606.

The transient response of the variator may be further optimized for specific operating conditions by use of additional machine or system parameters. For example, when desiring to optimize system operation at low ground speeds to even more effectively avoid engine underspeed, the compensation parameter 608 may optionally be further modified on the basis of the ground speed 326 of the machine, which is shown in FIG. 6 in dashed lines. In the illustrated embodiment, which is optional, the ground speed 326 is provided to a one-dimensional function 327. The function 327 provides a scaling factor 328 that is applied to the compensation parameter 608 at a multiplier 329. The scaling factors 328 can be predetermined and preprogrammed into the function 327 to provide a selectively enhanced or muted effect of the feed forward term depending on the speed of the machine. For example, the effect may be enhanced at low ground speeds to provide a quick control response and avoid engine underspeed. Similarly, the effect may be muted, for example, by providing scaling factors that are less than one, at higher engine speeds to provide for smoother shifting since the likelihood of engine underspeed at higher ground speeds is less.

Industrial Applicability

Figure 5:
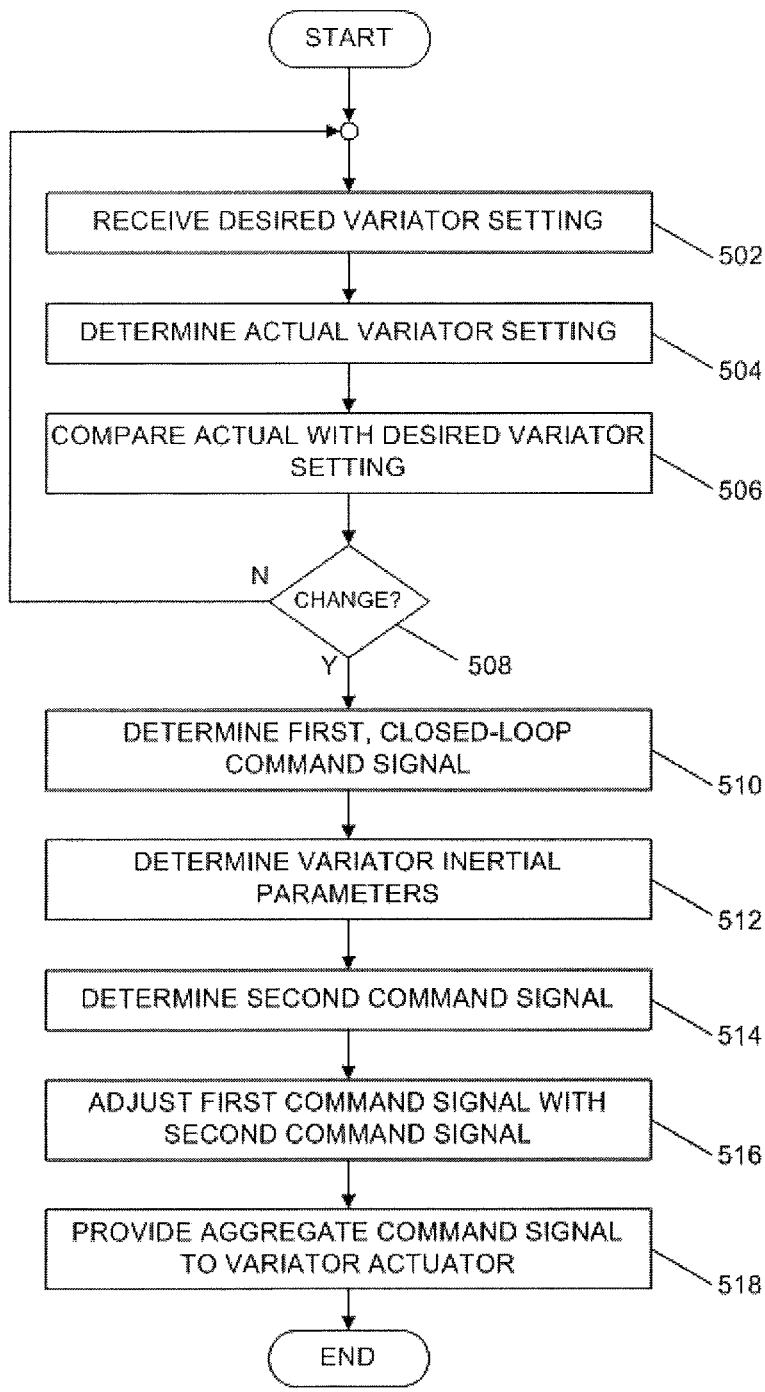
FIG. 5 is a flowchart for a method of controlling a variator in accordance with the disclosure.

The present disclosure is applicable to powertrains having variators and, more specifically, hydraulically actuated variators. A flowchart of a method for improving the transient response of a variator is shown in FIG. 5. When carrying out this method, it is presumed that the speed ratio of the variator, whether the variator is hydraulic, mechanical or electrical in nature, is responsive to a control signal from a controller. Further, the disclosed method may operate at discrete times or may alternatively operate continuously. Accordingly, a desired setting signal that is or can be correlated to a desired setting of the variator is received at 502. An actual setting of the variator is measured or otherwise determined at 504, and the two signals are compared at 506. When the comparison at 506 indicates that a change in setting has been commanded, a first command signal that is based on a closed-loop control scheme is determined at 508.

At the same time, a set of parameters that are indicative of the then present inertial state of the variator system are acquired at 510. The set of parameters may include the speed ratio of the variator, a derivative of the speed ratio of the variator, hydraulic fluid pressure drop and/or flow rate through valves controlling the variator setting, hydraulic fluid flow into and out from a variator actuator, hydraulic system pressure, ground speed, transmission speed and/or gear setting, and the like. A second command signal is determined at 512 based on a correlation between the second command signal and one or more of the set of parameters acquired at 510. The first command signal is adjusted on the basis of the second command signal at 514, and an aggregate command signal is provided to a variator actuator at 516. In one embodiment, the adjustment at 514 includes adding the second command signal to the first command signal as a feed forward term for the first command signal.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A powertrain for a machine, comprising:
   an engine having an output shaft;
   a transmission having a first input connected to the output shaft of the engine;

a variator that includes a pump connected to the output shaft and a motor connected to a second input of the transmission, said pump having a variable setting that is determinable by a position of a pump actuator that is responsive to a command signal;

a controller associated with the engine, transmission and variator, the controller disposed to control operation of the variator, at least in part, by providing the command signal to the pump actuator, said command signal being determined based on an operator command, a compensation term, the compensation term depending on a correlation function that uses a parameter related to a speed ratio between a pump speed and a motor speed, and a scaling factor, the scaling factor depending on a ground speed of the machine as a primary control parameter such that the scaling factor enhances a control response of the variator at low ground speeds to avoid engine underspeed, and is muted at high ground speeds to provide for smooth shifting.

2. The powertrain of claim 1, wherein the pump actuator includes a piston that is moveable within a bore by, at least in part, a differential between first and second hydraulic pressures applied to the bore on either side of the piston, the first hydraulic pressure being settable by a first valve and the second hydraulic pressure being settable by a second valve, the first and second valves being responsive to, respectively, first and second command signals from the controller.

3. The powertrain of claim 2, wherein the determination of the command signal based on the operator command is accomplished by providing a closed-loop control within the controller, the closed-loop control having a parameter indicative of a transmission torque output as a feedback.

4. The powertrain of claim 2, wherein the correlation function includes a lookup table tabulating values of a derivative of the speed ratio with values for a flow characteristic of the pump actuator.

5. The powertrain of claim 4, wherein the flow characteristic is a parameter indicative of hydraulic fluid flow into or out from the pump actuator.

6. The powertrain of claim 4, wherein the flow characteristic is a parameter indicative of a fluid flow through at least one of the first and second valves.

7. The powertrain of claim 1, wherein the feed-forward term further depends on a parameter indicative of a speed of an output shaft of the transmission.

8. The powertrain of claim 1, further comprising a main hydraulic pump connected to the engine and providing a hydraulic fluid flow to the pump actuator.

9. A continuously variable transmission for a machine having a variator associated with a transmission, comprising:
a variator pump having a variable setting that is determinable by a position of a pump actuator that is responsive to a command signal;
a variator motor that is driven by the variator pump and is connected to an input of the transmission; and
a controller disposed to control operation of the variator, at least in part, by providing the command signal to the pump actuator, said command signal being determined based on an operator command and on a compensation term, the compensation term being determined based on a correlation function of a derivative of a speed ratio between a pump speed and a motor speed, a flow characteristic of the pump actuator, and a scaling factor, the scaling factor depending on a ground speed of the machine as a primary control parameter such that the scaling factor enhances a control response of the variator at low ground speeds to avoid engine underspeed, and is muted at high ground speeds to provide for smooth shifting.

10. The continuously variable transmission of claim 9, wherein the pump actuator includes a piston that is moveable within a bore by, at least in part, a differential between first and second hydraulic pressures applied to the bore on either side of the piston, the first hydraulic pressure being settable by a first valve and the second hydraulic pressure being settable by a second valve, the first and second valves being responsive to, respectively, first and second command signals from the controller.

11. The continuously variable transmission of claim 10, wherein the determination of the command signal based on the operator command is accomplished by providing a closed-loop control within the controller, the closed-loop control having a parameter indicative of a transmission torque output as a feedback.

12. The continuously variable transmission of claim 10, wherein the correlation function includes a lookup table tabulating values of the derivative of the speed ratio with values for the flow characteristic of the pump actuator, the flow characteristic including at least one of a flow into the pump actuator, a flow out from the pump actuator, a direction of flow into or out from the pump actuator, a valve geometry, an equivalent orifice area and a flow force.

13. The continuously variable transmission of claim 12, wherein the flow characteristic is a parameter indicative of hydraulic fluid pressure within the pump actuator.

14. The continuously variable transmission of claim 12, wherein the flow characteristic is a parameter indicative of a fluid flow through at least one of the first and second valves.

15. The continuously variable transmission of claim 9, wherein the feed-forward term further depends on a parameter indicative of a speed of an output shaft of the transmission.

16. A method for improving a transient torque response of a continuously variable transmission for a machine, the continuously variable transmission including a variator associated with a transmission, the variator having a variable pump controlled by a pump actuator that is responsive to a command signal from a controller, the pump further operating a motor connected to an input of the transmission, comprising:
determining a closed-loop command signal for the pump actuator in the controller based on an operator command signal that is indicative of a desired torque output of the transmission;
calculating a derivative of a speed ratio between a pump speed and a motor speed of the variator in real time;
calculating a hydraulic fluid flow into or out from the pump actuator of the variator based on the derivative of the speed ratio;
determining a compensation command signal for the pump actuator based on a correlation function that determines the compensation command signal based on the hydraulic fluid flow;
determining a scaling factor for the compensation command signal, the scaling factor depending on a ground speed of the machine as a primary control parameter such that the scaling factor enhances an effect of the compensation command signal at low ground speeds to avoid engine underspeed and mutes the effect of the compensation command signal at high ground speeds to provide for smooth shifting;
combining the closed-loop command signal with the compensation command signal and the scaling factor into a compensated command signal; and providing the compensated command signal to a valve controlling a pressure within the pump actuator.

17. The method of claim 16, wherein the compensated command signal represents a sum of the closed-loop command signal, and the compensation command signal in combination with the scaling factor.

18. The method of claim 16, wherein the feed-forward command signal is further based on a ground speed of a machine into which the continuously variable transmission is installed.

19. The method of claim 16, wherein the pump actuator includes a piston that is moveable within a bore based, at least in part, on a differential pressure acting on the piston between first and second chambers of the bore, and wherein the hydraulic fluid flow on which the feed-forward command signal is based is a parameter indicative of a flow of fluid into at least one of the first and second chambers of the bore.

20. The method of claim 16, wherein determining the feed-forward command signal based on the correlation function includes interpolating the feed-forward command signal in a table that is populated by feed-forward command signal values with respect to ranges of values for each of the speed ratio and the hydraulic fluid flow.

\* \* \* \* \*